United States Patent

Bolinger

[15] 3,639,777

[45] Feb. 1, 1972

[54] FLASHER CIRCUIT

[72] Inventor: John F. Bolinger, Michigan City, Ind.

[73] Assignee: Meridian Industries, Inc., Southfield, Mich.

[22] Filed: June 22, 1970

[21] Appl. No.: 48,375

[52] U.S. Cl. .......... 307/202, 307/247, 307/255, 307/284, 317/33 SC, 331/113 R, 331/62, 307/260

[51] Int. Cl. .......... H02h 7/20, H03k 3/282

[58] Field of Search .......... 317/148.5 R, 148.5 B, 33; 331/113 R, 113 B, 62; 307/202, 247, 255, 284; 315/209

[56] References Cited

UNITED STATES PATENTS

| | | | |
|---|---|---|---|
| 2,832,900 | 4/1958 | Ford | 307/202 X |
| 3,217,207 | 11/1965 | Webb | 317/33 X |
| 3,259,852 | 7/1966 | Todd | 331/62 X |
| 3,408,540 | 10/1968 | Nield et al. | 317/148.5 B |
| 3,421,108 | 1/1969 | Keller | 331/62 X |
| 3,551,744 | 12/1970 | Keller et al | 317/33 X |

*Primary Examiner*—John S. Heyman
*Attorney*—Barnard, McGlynn & Reising

[57] ABSTRACT

A flasher circuit has a power transistor controlling a circuit with a load therein; a multivibrator produces a timed pulse signal applied to the power transistor for turning the power transistor "on"; and additional voltage-sensing silicon-controlled rectifier means coupled to the load and sensitive to a reduction in the voltage therethrough, due to a short, is operatively connected to the power transistor for preventing the power transistor to be turned "on" in the presence of such a short.

2 Claims, 1 Drawing Figure

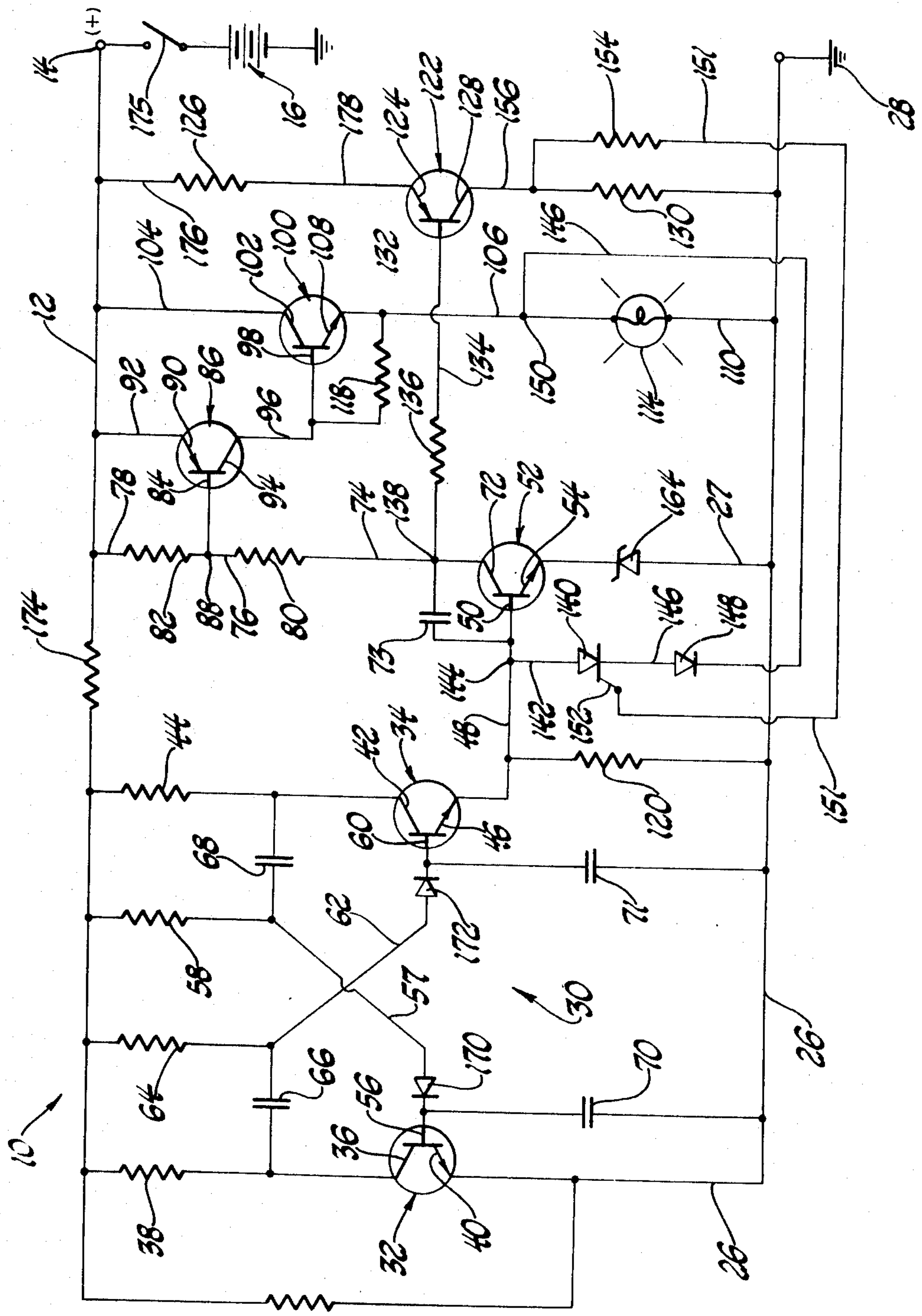
INVENTOR.
John F. Bolinger
BY
Winnie & Romanski
ATTORNEYS

FLASHER CIRCUIT

BACKGROUND OF THE INVENTION

Heretofore various circuits have been proposed for use as flasher circuits. However, such flasher circuits, especially when employing transistors for the load circuit, are susceptible to damage resulting from high current flow through the load circuit occasioned by the occurrence of a short in the load.

Various forms of short protection means have been proposed by the prior art; however, they have not been entirely successful. For example, some, at the occurrence of a poor short, were incapable of shutting down the power transistor but only to such values wherein the transistor was still susceptible to failure because of either the remaining relatively high current value or the internal heat generation resulting therefrom.

Accordingly, the invention as herein disclosed and described is directly concerned with the solution of the above as well as other related problems.

SUMMARY OF THE INVENTION

According to the invention, a switching circuit comprises electrical load means, a load circuit containing said electrical load means, first load switching means in circuit with said load circuit, second means for cyclically producing a control signal for causing said first switching means to be at times rendered conductive, and additional means responsive to the occurrence of a short condition in said load means and being effective in response thereto to prevent the said first switching means from becoming conductive.

Various general and specific objects and advantages of the invention will become apparent when reference is made to the following detailed description considered in conjunction with the drawings.

DESCRIPTION OF THE DRAWINGS

The single drawing is a schematic wiring diagram of a flasher circuit employing the invention disclosed herein.

DESCRIPTION OF THE PREFERRED EMBODIMENTS

Referring now in greater detail, the single drawing illustrates a flasher circuit 10 comprised of a first conductor 12 having an end 14 suited for connection to a suitable source of electrical potential 16 and a second conductor 26 which leads to ground as at 28.

A signal-producing portion 30 of the circuit 10 is illustrated as comprising oscillator means composed of transistors 32 and 34. Transistor 32 has its collector electrode 36 connected in series with a resistor 38 leading to conductor 12 while its emitter electrode 40 is connected to conductor 26. Transistor 34 similarly has its collector electrode 42 connected, in series with a resistor 44, to conductor 12 while its emitter electrode 46 is connected, via conductor 48, to the base electrode 50 of a third transistor 52 which, in turn, has its emitter electrode 54 connected to conductor 26 via conductor means 27.

Base electrode 56 of transistor 32 is electrically connected, via conductor 57, in series with one end of a resistor 58 which has its other end connected to conductor 12. Similarly, base electrode 60 of transistor 34 is electrically connected, via conductor 62, in series with one end of a resistor 64 which has its other end also connected to conductor 12.

A first capacitor 66 has one end or side connected to a point electrically between resistor 38 and collector electrode 36 and the other end or side connected to conductor 62. A second capacitor 68 similarly has one side connected to a point electrically between resistor 44 and collector electrode 42 of transistor 34 while its other side is connected to conductor 57. Additionally, capacitors 70 and 71 may be provided so as to have their respective one sides connected to conductors 57 and 62 while their respective other sides are connected to ground through conductor 26.

The collector electrode 72 of transistor 52 is connected to a voltage divider network comprised of conductors 74, 76 and 78 between which are serially connected resistors 80 and 82. Conductor 78 is connected to conductor 12 while the base electrode 84 of a fourth transistor 86 is connected to a point generally between resistors 80 and 82 as at 88 on conductor 76. Transistor 86, which may be considered as a switching transistor, has its emitter electrode 90 connected to conductor 12 as by means of a conductor 92 while the collector electrode 94 thereof is connected, via conductor 96, to the base terminal 98 of a power or load-switching transistor 100 the collector 102 of which is connected to conductor 12 by means of conductor 104. A conductor 106, connected at one end to the emitter 108 of transistor 100, has its other end connected to related electrical load means 114 which, in turn, is connected to ground 28 as by conductors 110 and 26. As shown, a resistor 118 has its opposite ends connected to conductors 96 and 106 while resistor 120 has its opposite ends respectively connected to conductors 48 and 26.

The short protection means comprises a shutdown transistor 122 having its emitter 124 connected, through a resistor 126, to conductor 12 while its collector 128 is connected, through a resistor 130, to ground as by conductor 26. The base electrode 132 of transistor 122 is connected, as by a conductor 134 and resistor 136 in series therewith, to conductor 74 as at 138.

A silicon-controlled rectifier (SCR) 140 has its anode connected, via conductor 142, to conductor 48, as at 144, while its cathode is connected by means of a conductor 146, which may include a diode 148 serially arranged therewith, to conductor 106 as at 150. The gate electrode 152 of SCR 140 is connected through a conductor 151, including a serially situated resistor 154, to conductor 156 leading between collector 128 and resistor 130.

Generally, in order to make an SCR conductive, forwardly, it is necessary to apply a voltage across the anode to cathode terminals of the SCR (making the anode positive, +, with respect to the cathode) and at the same time apply a voltage (or current flow) to the gate-to-cathode circuit by making the gate positive, +, with respect to the cathode. Of course, if after the SCR is made conductive, current flow from the anode to cathode is interrupted, the SCR will again go into its nonconductive state.

Further, it has been found that a zener diode 164 is preferably serially provided in conductor means 27. Diodes 170 and 172 respectively connected in the base circuits of transistors 32 and 34, although not essential to the practice of the invention, are nevertheless preferred in order to serve as voltage limiters for such transistors. In this connection, resistor 174, in series with conductor 12, may also be employed as a means of reducing the line voltage to the oscillator or multivibrator section 30. Capacitors 70, 71 and 73 are primarily provided as a means of noise suppression in order to prevent transistors 32, 34 and 52 from going into conduction as a result of stray signals.

OPERATION OF THE INVENTION

In view of the above, it can be seen that each of transistors 32, 34, 52 and 100 are of the NPN-type while transistors 86 and 122 are of the PNP-type. Accordingly, during normal conduction, in the NPN-type, the emitter will be negative with respect to both the collector and base while the collector is positive with respect to both the emitter and base. In the PNP-type, normal operation or conduction is achieved when the emitter is positive with respect to both the collector and base while the collector is negative with respect to both the emitter and base.

Further, transistors 32 and 34 comprise a multivibrator the operation of which is generally as follows. Assuming that a related control switch 175 is closed, let is be assumed that transistor 32 has just switched "on", creating current flow through the emitter-collector circuit 40, 36, and that transistor 34 has switched "off" or to its nonconducting state. It can be seen that at this particular instant capacitor 66 was fully charged and that the side thereof connected to resistor 64 was negative with respect to the other side of capacitor 66 which is connected to resistor 38 and collector 36. The circuit through emitter-collector circuit 36, 40 is completed to ground 28 as by conductor 26. At this time capacitor 68 will be discharged.

Capacitor 66 now starts charging toward the opposite polarity through resistor 64 by virtue of being essentially connected to conductor 26 when transistor 32 is conducting and the emitter-collector circuit thereof is completed. It can also be seen that because of the charge existing on capacitor 66, at the instant that transistor 32 went into conduction, and its connection to base electrode 60 of transistor 34 via conductor 62, the emitter-base electrodes of transistor 34 are reverse biased (the base being negative with respect to emitter 46) thereby keeping transistor 34 in an off or nonconducting state. At this same time, capacitor 68 will start to charge essentially through the emitter-base circuit of transistor 32 and resistor 44. This charging current holds transistor 32 conductive or "-hard-on"; further, even when charging of capacitor 68 is completed, the transistor 32 will remain conductive by virtue of the base current provided by resistor 58.

As the potential across capacitor 66, holding transistor 34 off, is reduced, a condition is finally attained where the capacitor 66 voltage can no longer maintain transistor 34 in the nonconducting state. As transistor 34 starts to become conductive, by virtue of a biasing current through resistor 64, the collector to emitter voltage thereof drops and the charged capacitor 68 now starts to discharge through the emitter-base circuit of transistor 32, resulting in a reverse bias driving transistor 32 into nonconduction.

When transistor 32 is thusly driven into nonconduction, the voltage across its emitter 40 and collector 36 increases causing capacitor 66 to again start charging through the emitter-base circuit of conductive transistor 34.

In this new state (transistor 34 being conductive) capacitor 68 starts to charge toward the opposite polarity through resistor 58 by virtue of being connected to conductor 26 through the conducting transistor 34. When transistor 34 was switched into conduction, capacitor 68 was negatively charged on its side connected to conductor 57, with respect to its side connected between resistor 44 and collector 42. Further, the polarity on capacitor 68, at the time of switching transistor 34 "on", produces a reverse bias on transistor 32.

During the time that transistor 34 is conducting capacitor 66 is being charged so that its end of side connected to resistor 64 and conductor 62 will become negative with respect to its side connected between resistor 38 and collector 36. Such charging of the capacitor 66 is the consequence of the base current flow through transistor 34 which also serves to hold the transistor 34 in its "on" or conductive state. It should be apparent that transistor 32 is also maintained conductive for some period after capacitor 66 has been fully charged because of the base bias provided by resistor 64.

However, as capacitor 68 continues to discharge and the voltage thereacross approaches zero, the voltage holding transistor 32 in a nonconducting state decreases and transistor 32 starts to again become conductive. This initiates the regenerative cycle which results in the rapid "turn on" of transistor 32 and "turn off" of transistor 34 as well as the subsequent rapid "turn off" of transistor 32 and "turn on" of transistor 34. In this arrangement resistors 38 and 44 serve to respectively limit the collector currents of transistors 32 and 34 while resistor 64 and capacitor 66 combine to determine the "off" or nonconducting time of transistor 34 and, similarly, resistor 58 and capacitor 68 combine to determine the "off" or nonconducting time of transistor 32.

It can be seen that when transistor 34 is in its conducting state, the emitter-base circuit of transistor 52 is biased into conduction thereby completing the circuit through the emitter 54 and collector 72 of transistor 52. When transistor 52 is thusly driven into conduction, a circuit is completed through conductors 78, 76 and 74, collector electrode 72, emitter 54 and conductor means 27 causing a voltage drop to occur across resistor 82 thereby causing point 88 and base 84 to be negative with respect to emitter 90 which is exposed to plus (+) potential of conductor 12. Consequently switching transistor 86 is turned "on" completing a circuit through the emitter 90 and collector 94 thereby, through conductor 96, placing the base electrode 98 of load or power transistor 100 effectively at the plus (+) potential of conductor 12. The emitter 108 is, in turn, at negative potential of ground 28. Accordingly, with emitter 108 negative with respect to base 98, transistor 100 is turned "on" completing the load circuit comprised of conductors 104, collector 102, emitter 108, conductor 106, load means 114 and conductor 110. As should be apparent, the diagrammatically depicted load means 114 may in fact be comprised of, for example, one or a plurality of lamps or bulbs and, as is often the case, some of such bulbs could be located within the interior of the vehicular passenger compartment, as operator signal readouts, while others could be located externally of the vehicle as indicators to pedestrians and vehicular traffic.

In view of the preceding, it can be seen that, in the embodiment disclosed, every time that oscillator or multivibrator transistor 34 is turned "on" the buffer transistor 52, switching transistor 86 and load transistor 100 are likewise turned "on". The contrary is, of course, true; that is, whenever transistor 34 is in its "off" or nonconductive state, transistors 52, 86 and 100 are also in their "off" or nonconductive state.

Now, considering the short protection means, it will be remembered that in order to make the SCR 140 conductive, both the anode and gate thereof have to be made positive with respect to the cathode. Accordingly, it can be seen that whenever the shutdown transistor 122 is "off" or in a nonconductive state, the circuit described by conductor 176, resistor 126, conductor 178, conductor 156 and resistor 130 is open by virtue of no conduction through the emitter-collector circuit of transistor 122. Consequently, the gate electrode 152 of SCR 140 will be at negative or ground potential by virtue of its connection to conductor 156.

However, it will be noted that each time transistor 52 goes into conduction base 132 of transistor 122 is effectively brought to ground potential as at point 138 thereby causing transistor 122 to become conductive completing the circuit through conductors 176, 178 and 156. Gate 152 is therefore made positive by virtue of resistors 126 and 130 acting as a voltage divider. However, SCR 140 does not go into conduction because its cathode is effectively at positive potential by virtue of its connection to conductor 106 as at 150 which, because of transistor 100 being "on", is at the plus (+) potential of conductor 12.

Now, let it be assumed that a short has occurred in the load means 114 and that transistor 34 had just turned "on" which, as explained above, causes the transistor 122 to be simultaneously turned "on". Therefore, gate 152 of SCR 140 is made positive (+) and the cathode of SCR 140, by virtue of the short in the load circuit or load means 114, is placed effectively at ground potential. Further, with transistor 34 being "on" the anode of SCR 140 is at some plus (+) value relative to its cathode. This, of course, as previously explained, causes SCR 140 to become conductive completing a circuit from point 144 through conductors 142, 146 and 112.

When the SCR thereby becomes conductive, the forward bias on the base-emitter circuit of transistor 52 is eliminated or so reduced as to prevent transistor 52 from going to conduction which, in turn, prevents transistors 86 and 100 from being turned "on" thereby eliminating the possibility of damage to the load transistor 100 as a consequence of such a short in the load.

As was previously stated, it has been found advantageous to provide means such as the zener diode 164. That is, when SCR 140 is made conductive, a voltage drop, in the order of possibly 1.0 volts, will occur across the SCR 140. However, this voltage drop would also appear across the base-emitter diode of the transistor 52 and could be sufficient to cause the transistor 52 to become conductive. Accordingly, by including the zener diode 164 in the emitter circuit of transistor 52 such possible "turn-on" of the transistor will be positively prevented until the potential across the base-emitter-zener becomes of a value distinctly in excess of the voltage drop across SCR 140 when in its conducting state.

In view of the preceding, it should be apparent that functional equivalents could be substituted for the various sections of the circuitry as well as components or elements contained therein. For example, the oscillator or timer section 30 may be an oscillator, multivibrator, triggered flip-flop, or any suitable circuit which will provide an output of cyclically recurring pulses of DC current. Also, as should be apparent, the circuitry disclosed could be practical employing NPN-transistors for those that are shown as PNP and vice versa where appropriate polarity changes are made as is well known in the art.

Although only one embodiment of the invention has been disclosed and described, it should be apparent that other embodiments and modification of the invention are possible within the scope of the appended claims.

I claim:

1. In a flasher circuit for use with an automotive vehicle, said flasher circuit being of the type adapted to intermittently energize selected lamps of the vehicle from a battery and comprising a free-running oscillator for producing a pulsed control signal, a switching transistor having its output adapted to be connected with said battery and said lamps for switching the lamps on and off in response to said pulsed control signal, a driver transistor having its output connected with the input of the switching transistor and having its input operatively connected with the output of said oscillator, voltage responsive means being operative to disable the driver transistor when a short circuit of the lamps causes the voltage across the lamps to fall below a predetermined value, thereby preventing turning on of the switching transistor for the duration of the short circuit, the improvement comprising a controlled rectifier with its anode-cathode circuit connected across the input of the driver transistor through said lamps whereby said control signal is applied across the controlled rectifier in the forward direction, a semiconductor diode connected in series between the controlled rectifier and the lamps, a voltage reference transistor having an output adapted to be connected across the battery and an input connected to the output of the driver transistor whereby the voltage reference transistor becomes conductive when a short circuit of the lamps causes the voltage thereacross to drop below the predetermined value, thereby disabling the driver transistor and the switching transistor for the duration of the short circuit, the controlled rectifier becoming nonconductive between pulses of the control signal, thereby automatically allowing operation of the driver transistor and switching transistor to be restored when the short circuit is removed.

2. The invention as defined in claim 1 and further including a zener diode connected in the input of the driver transistor to maintain the driver transistor disabled until the voltage across the lamps exceeds said predetermined value.

* * * * *